US008384250B2

(12) United States Patent
Underwood et al.

(10) Patent No.: US 8,384,250 B2
(45) Date of Patent: Feb. 26, 2013

(54) COMPUTER-CONTROLLED CONNECTOR-PANEL SYSTEM

(75) Inventors: Rosa M. Underwood, Washington, DC (US); Henry A. McKelvey, Capitol Heights, MD (US); Jimmie D. Peterman, Glendale, MD (US); Emory L. Young, Reisterstown, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 344 days.

(21) Appl. No.: 12/184,464

(22) Filed: Aug. 1, 2008

(65) Prior Publication Data

US 2010/0029117 A1    Feb. 4, 2010

(51) Int. Cl.
*H01B 7/30* (2006.01)
*H01B 11/02* (2006.01)
*H02B 1/20* (2006.01)
*H02G 5/06* (2006.01)

(52) U.S. Cl. ........ 307/147; 700/245; 700/246; 700/247; 700/248; 700/249; 700/250; 700/251; 700/252; 700/253; 700/254; 700/255; 700/256; 700/257; 700/258; 700/259; 700/260; 700/261; 700/262; 700/263; 700/264; 398/109

(58) Field of Classification Search ............ 307/147
See application file for complete search history.

(56) References Cited

U.S. PATENT DOCUMENTS

| | | | | |
|---|---|---|---|---|
| 4,955,652 A * | 9/1990 | Brugere et al. | ............. | 294/106 |
| 5,613,012 A * | 3/1997 | Hoffman et al. | ............. | 382/115 |
| 5,615,277 A * | 3/1997 | Hoffman | ............. | 382/115 |
| 6,151,536 A * | 11/2000 | Arnold et al. | ............. | 700/237 |
| 6,157,866 A * | 12/2000 | Conboy et al. | ............. | 700/121 |
| 6,377,874 B1 * | 4/2002 | Ykema | ............. | 700/286 |
| 6,612,044 B2 * | 9/2003 | Raab et al. | ............. | 33/503 |
| 6,638,090 B2 * | 10/2003 | Wakata | ............. | 439/271 |
| 6,802,723 B2 * | 10/2004 | Decime et al. | ............. | 439/135 |
| 6,990,544 B1 * | 1/2006 | Raymond et al. | ............. | 710/302 |
| 7,239,522 B2 * | 7/2007 | Rust et al. | ............. | 361/732 |
| 2003/0191849 A1 * | 10/2003 | Leong et al. | ............. | 709/229 |
| 2006/0107073 A1 * | 5/2006 | Lane et al. | ............. | 713/194 |
| 2006/0178776 A1 * | 8/2006 | Feingold et al. | ............. | 700/245 |
| 2006/0229740 A1 * | 10/2006 | Kreisel et al. | ............. | 700/22 |
| 2008/0150677 A1 * | 6/2008 | Arakawa | ............. | 340/5.2 |

* cited by examiner

*Primary Examiner* — Hal Kaplan

(57) ABSTRACT

A system and method for ensuring that a large number of connectors, such as fiber-optic cable-connectors, which are plugged-into connector-receptacles arrayed across a connector-panel, are not intentionally disconnected by an un-authorized user with malicious intent, or accidentally unplugged by an authorized technician who may be trying to manually pull-out a specific connector for testing or other purposes but, inadvertently, could otherwise unplug a neighboring connector because of not being able to clearly see which plug is actually being removed due to the large number of cables that are connected to the panel. The connectors are locked in place by restraining arms which are controlled by solenoids or motors. Each restraining arm can be commanded to release its respective connector, but only when the correct command from a computer is received. The same system and method can be applied to connector-receptacles arrayed on one or both sides of the panel. The same system and method can be applied to other cables, such as coax cables or Cat 5 cables.

31 Claims, 8 Drawing Sheets

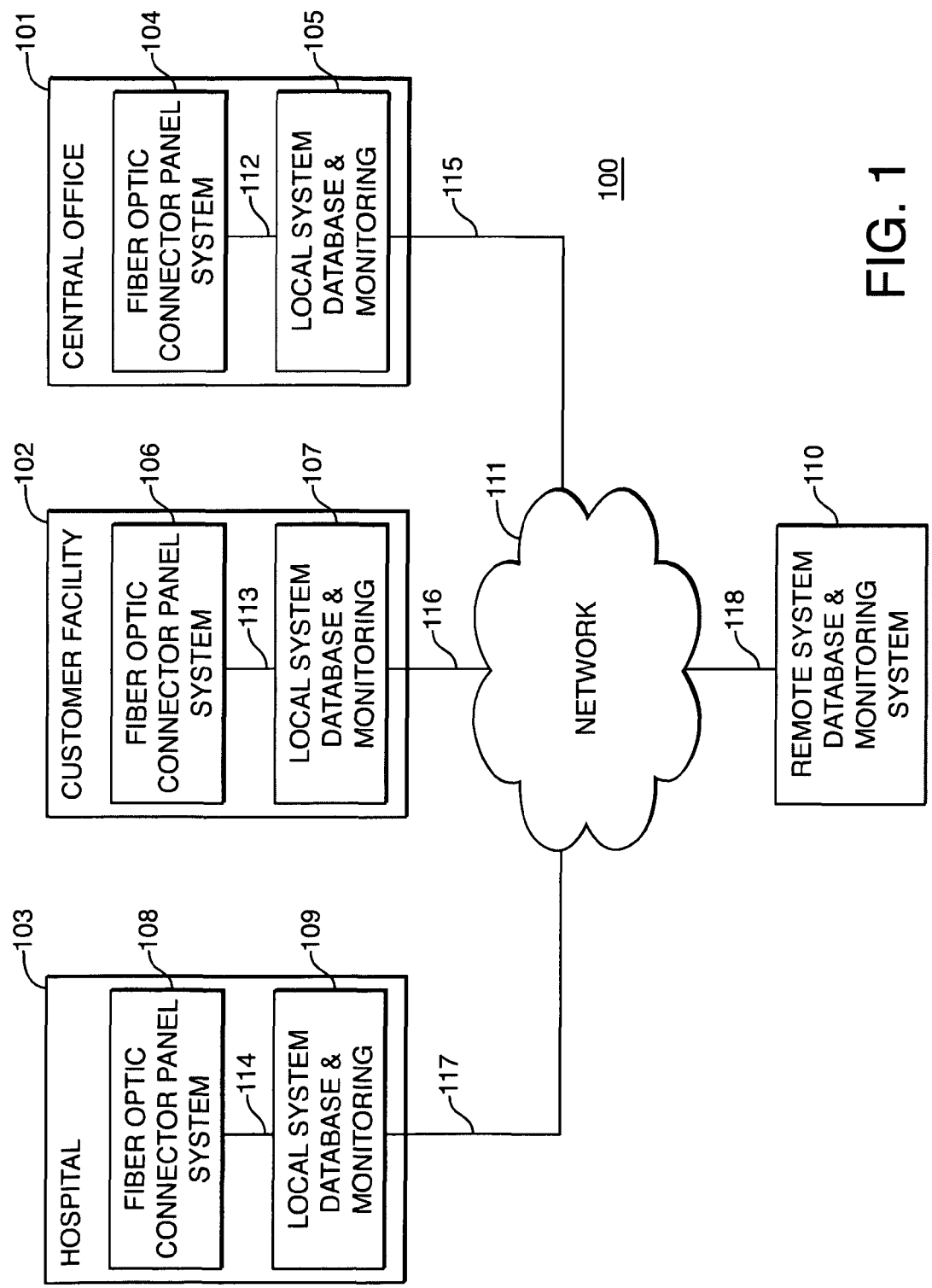

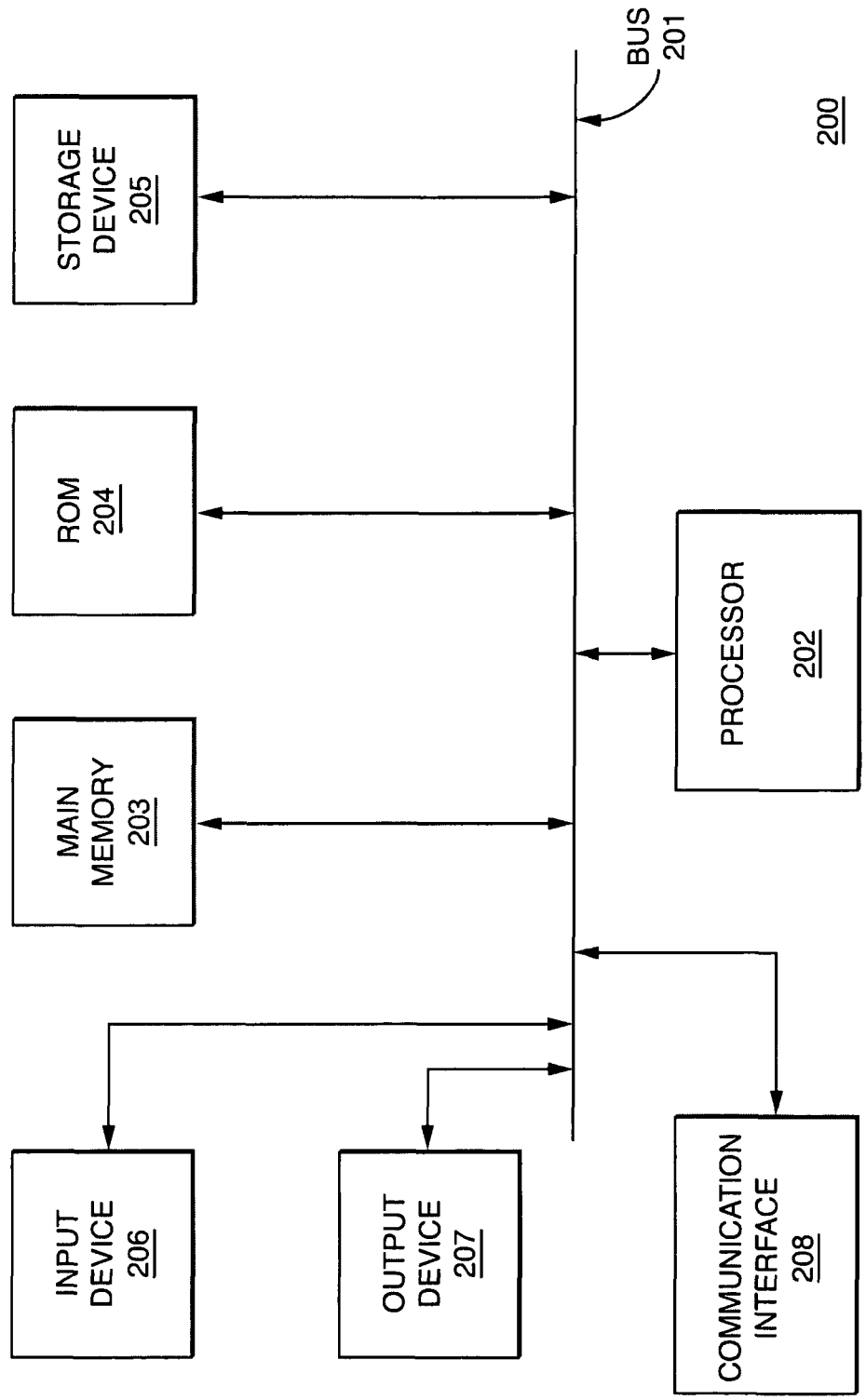

| CO-ORDINATES 701 | CONNECTED PARTY(S) I.D. 702 | LOCKING ARM STATUS 703 | CONNECTOR IN RECEPTACLE | CONNECTION CRITICALITY OR PURPOSE 704 | COMPANION CABLE CONNECTED 705 | ALARM 706 |
|---|---|---|---|---|---|---|
| A1 | XYZ HOSPITAL | LOCKED | YES | HIGH | YES | NO |
| B1 | ABC COMPANY | UNLOCKED | YES | MEDIUM | YES | YES |
| A2 | AT HOME PATIENT | LOCKED | YES | HIGH | YES | NO |
| B2 | NOT USED | LOCKED | NO | N/A | NO | N/A |
|  |  |  |  |  |  |  |
|  |  |  |  |  |  |  |
|  |  |  |  |  |  |  |
| K15 | ZYX INC | LOCKED | NO | LOW | YES | NO |

FIG. 7

COMPUTER-CONTROLLED CONNECTOR-PANEL SYSTEM

BACKGROUND

Fiber-optic cable connections for communication and data transmission purposes need to be secure and reliable. Although the probability of an inadvertent disconnection of a single fiber-optic cable may be relatively low, when a large number of fiber-optic connections are encountered in a connector panel, e.g., in a central office in a telecommunications company, the probability of an inadvertent disconnection is much higher. A neighboring connector to an intended connector can mistakenly be pulled out. This human error flows from the large number of cable interconnections that are grouped-together in a small space.

For example, in a typical fiber-optic connection panel in a central office today, there can be as many as 100 fiber-optic cable-connector-receptacles which are the slots into which the cable-connectors are plugged (sometimes referred to herein as "bulkheads"). These cable-connector-receptacles are arrayed across a panel which may be only three ft. wide by two ft. high and possibly only two ft. wide by one ft. high. Technological visionaries can see this number approaching and possibly exceeding 500 receptacles per panel in the future. The high density of even 100 interconnections on a connector-panel encourages human error. Inadvertently, these cables can be mis-labeled resulting in removal of the wrong cable. Furthermore, it is easy to envision a scenario where a tester-technician reaches his or her hand into a mass of dangling cables connected to a connector-panel to undue a particular connection and, because of poor visibility caused by the mass of cables, mistakenly yanks out a neighboring connection. At that moment, havoc may be wreaked upon anyone relying upon that neighboring connection. Even a momentary disconnect can be catastrophic.

Indeed, some of these fiber optic connections may be used for connecting telemetry equipment located at hospitals to other medical equipment located remotely at universities or teaching hospitals, etc. where patient data is being analyzed by experts and where life and death situations are common. Or, these connections may be used for continuous monitoring of out-patients located at their homes, again where loss of the connection could be life-threatening.

Since usage of fiber-optic cables is increasing rapidly because of enhanced bandwidth provided by fiber-optics vs. copper cabling, other usages for a large number of fiber-optic cables with no room for error can also be envisioned—e.g., national security military applications, air-traffic controller applications, etc. These other examples may suggest an additional possibility that someone with bad motives to create havoc or sabotage can intentionally try to unplug these connections.

Therefore, there is a need for managing a large number of cable interconnections, regardless of whether they are fiber-optic cable connections, co-axial cable connections, Category 1-6 twisted pair cable connections, including the familiar Category 5 (Cat 5) twisted pair cable connection or other connections in a manner to reduce the probability of inadvertent disconnection or sabotage. Applicants' instant specification, drawings and claimed embodiments satisfy that need.

BRIEF DESCRIPTION OF THE DRAWINGS

FIG. 1 is an exemplary diagram of a network in which a computer-controlled connector-panel system may be advantageously employed;

FIG. 2 is an exemplary block diagram of a generic computer which may be advantageously utilized in both the Local and Remote System Databases and Monitoring Systems functionality of FIG. 1;

FIG. 7 is an exemplary schematic diagram of a database which may be retained in, and used by the computer of FIG. 2.

DETAILED DESCRIPTION OF PREFERRED EMBODIMENTS

Figure 1A:
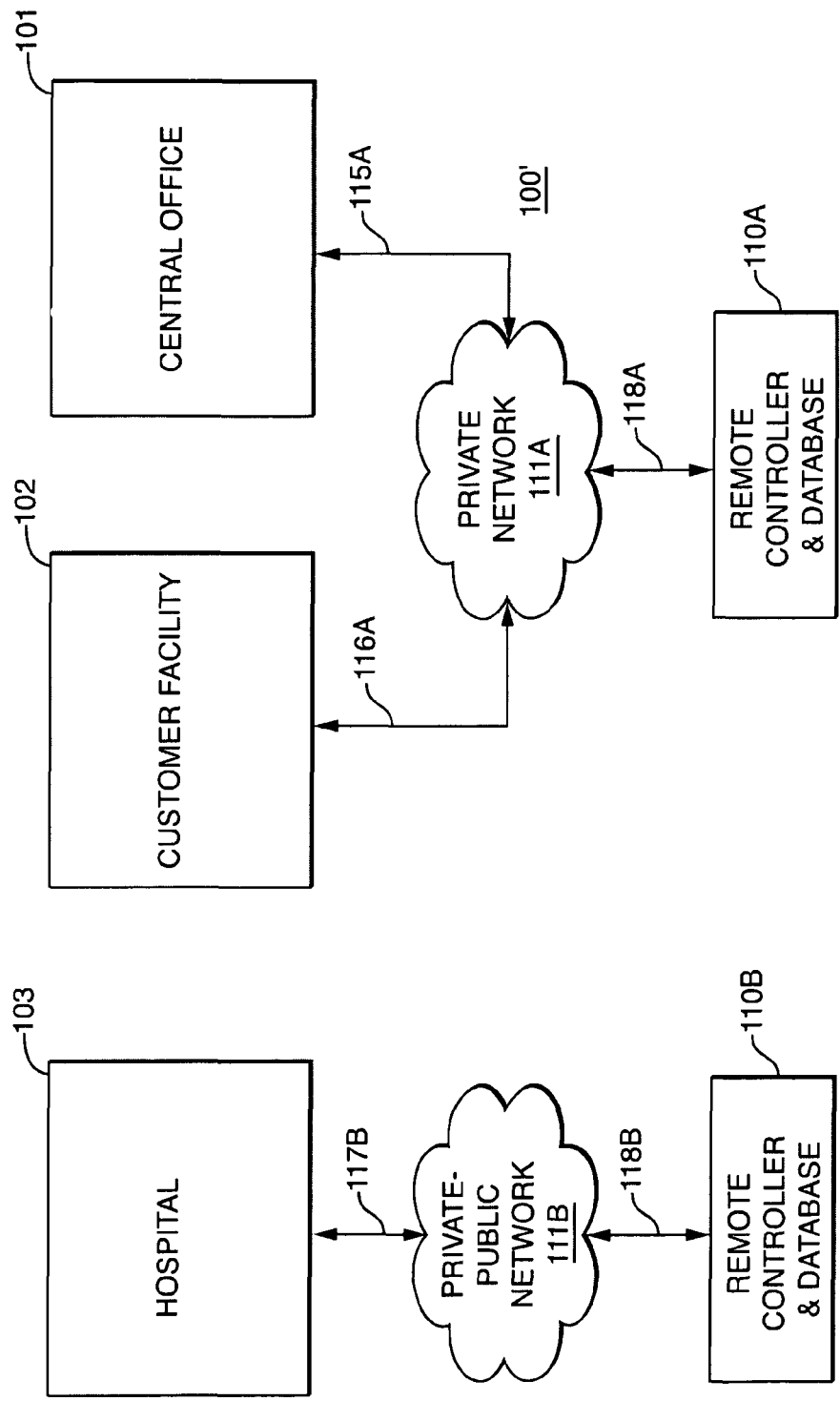
FIG. 1A is an exemplary diagram of a network, organized differently from that of FIG. 1, in which a computer-controlled connector panel system may be advantageously employed.

In this description, the same reference numeral in different Figs. is referring to the same entity. Reference numerals of each Fig. start with the same number as the number of that Fig. For example, FIG. 6 has numerals in the "600" category and FIG. 7 has numerals in the "700" category, etc. Thus, if discussing an entity in a Fig. having a particular reference numeral not starting with the same number as that Fig. one can easily refer back to the appropriate Fig.

Exemplary embodiments of a computer-controlled connector panel system include a computerized system and method for controlling the manual insertion of one or more of a number of cable-connectors into, and/or removal of one or more of a number of cable-connectors from, a like number of lockable connector-receptacles arrayed in a connector-panel. Each receptacle has its own dedicated locking sub-system including a locking arm and solenoid or motor for actuating that arm. When the locking arm is restraining an inserted connector, it prevents removal of that connector unless and until the appropriate computer command is transmitted to that particular locking sub-system to actuate its locking arm. The locking arm is unlocked only under computer control, whereby all locked arms at the time of power-failure remain locked during power outage. Thus, in a large array of connections, where one connector can be unlocked at a time, embodiments of the computer-controlled connector panel ensure that any human attempt at manual removal of a connector shall result in removal of only the intended connector. This prevents accidental removal of a neighboring connector because all neighboring connectors remained locked in place. However, in alternative embodiments, more than one connector can be unlocked at the same time, if desired, which may be useful to do if the several connectors that are chosen to be concurrently unlocked are known to be making uncritical connections and, in addition, are positioned in the array not near each other so that potentially mistaken removals are not going to occur.

FIG. 1 is an exemplary diagram of a network 100 in which embodiments of the computer-controlled connector panel may be advantageously employed within a telecommunications company's facility or within its customers' facilities. For example, company central office 101, generic industrial-customer 102, and specific hospital-customer 103 are examples of typical locations in which these embodiments may be advantageously employed. Central office 101 includes connector-panel system 104 and local system database and monitoring 105; customer facility 102 includes connector-panel system 106 and local system database and monitoring 107; and, hospital customer 103 includes connector-panel system 108 and local system database and monitoring 109. (Hereinafter each of these local system database and monitoring functions may be referred to as a "controller" or a "local controller.") As explained in more detail below, controllers 105, 107 and 109 each controls its respective connector-panel system because each allows an authorized user located at its facility to send commands to its connector-panel system to cause particular locking-arms associated with particular connector-receptacles to change state.

Remote system database and monitoring system 110 (hereafter "remote controller 110") is shown at the bottom of the diagram and is geographically distant from locations 101, 102 and 103. Remote controller 110, which can typically be located at a network operations facility of a telecommunications company, can be linked to controllers 105, 107 and 109 through a network which can be the Internet (i.e., a public network) or some other suitable network. The communication links through network 111, namely links 115, 116, 117 and 118, can all be Ethernet links, or other suitable communication paths. Wire-line and/or wireless links can be used. The links 112, 113 and 114, internal to facilities 101, 102 and 103, respectively, each linking together its respective local controller and connector-panel system, can each be a USB connection or some other suitable connection.

FIG. 1A is an exemplary diagram of a differently-organized network in which embodiments of the computer-controlled connector panel may be advantageously employed, and is presented as but one example of many possible variations. Central office 101, customer facility 102 and hospital 103 are identical to like-identified locations in FIG. 1. Each location includes the same connector-panel system and local controller that is shown in FIG. 1 (i.e., 104 and 105 shown in FIG. 1 are included in 101 of FIG. 1A, etc.) The principal difference between FIG. 1 and FIG. 1A is that there are separate networks 111A characterized as a private network and 111B characterized as a private-public network in FIG. 1A, with each separate network operating with its own, dedicated remote controller. Although the different dedicated remote controllers can each be located at a different location, they are all under control of the same telecommunications company.

Private network 111A connects remote controller 110A (including its database) to both central office 101 and customer facility 102 via links 118A, 115A and 116A as shown, such links being the same as, or similar to, those described in connection with links 118, 115 and 116, respectively, in FIG. 1. Central office 101 is the property of the telecommunications company and, although generic customer facility 102 may not be owned by the company, there may be particular reasons why both facilities should be handled over the same dedicated private network, such as a local area network (LAN), not accessible by the public, as shown.

On the other hand, where a customer may have public network access requirements as well as proprietary networking requirements, such as Hospital customer 103, it may be advantageous for that customer to have a communication capability via a different private-public combination network. For example, remote controller and database 110B can be connected via private-public network 111B (such as a combination of LAN and Internet) to Hospital customer 103 via links 118B and 117B which are similar to, or the same as, links 118 and 117, respectively, of FIG. 1. Therefore, the single remote controller 110 of FIG. 1 is not the only option for remote control of connector panels at various facilities, and other variations of network organization beyond those shown herein can be implemented, as may be needed.

In the private network, network security techniques which are proprietary to the telecommunications company can be implemented. However, if the Internet is to be used, those proprietary techniques may not be compatible. In that case, Internet Protocol (IP) security can be provided, for example, by Secure Shell v2 (SSHv2) and above, over IPSec. This software shall create a secure platform from which the system can be controlled. Default operation under SSH can be constrained to usage of port 22 SSH v2 or higher and, under no circumstances, would it be permitted to default, or revert, to SSH v1. The IPSec may default to Encapsulating Security Payload (ESP) where only the payload is encrypted and, if so, IPSec would allow for Authentication Header (AH) security if needed, where the header of the packet could also be encrypted. A Command Line Interface (CLI), may be accessed through SSH v2, but only with telnet and other remote access applications disabled throughout the control network. File Transfer Functionality may take place through the Secure Copy (SCP) or Secure File Transfer Protocol (SFTP) features which are provided by SSH. In this manner, commands transmitted over the Internet for controlling, or unlocking, specific locking arms on specific panels in specific customer sites are carefully protected from nefarious hacking activity which, otherwise, could be problematic.

FIG. 2 is an exemplary block diagram of a generic computer which may be advantageously utilized in both remote controller 110 and controllers 105, 107 and 109 of FIG. 1. The functionality of remote controller 110 can be similar to the functionality of any of the controllers 105, 107 or 109. Computer 200 includes a bus 201, a processor 202, a main memory 203, a read only memory (ROM) 204, a storage device 205, an input device 206, an output device 207, and a communication interface 208. The processor may include any type of conventional processor or microprocessor that interprets and executes instructions. Main memory 203 may be a random access memory (RAM) or another type of dynamic storage device that stores information and instructions for execution by processor 202. ROM 204 may include a conventional ROM device or another type of static storage device that stores static information and instructions for processor 202. The storage device 205 may include any type of magnetic or optical recording medium and its corresponding drive, such as a magnetic disk or optical disk and its corresponding disk drive.

The input device 206 may include any conventional mechanism that permits an operator or user to input information to the computer, such as a keyboard, a mouse, a pen, voice recognition and/or biometric mechanisms, etc. The output device 207 may include any conventional mechanism that outputs information to the operator, including a graphical user interface (GUI) display, a printer, a pair of speakers, etc. The communication interface 208 may include any transceiver-like mechanism that enables computer 200 to communicate with other devices and/or systems. For example, the communication interface 208 may include a modem or an Ethernet interface for communicating via the Internet or via a local area network (LAN). Alternatively, the communication interface 208 may include other mechanisms for communicating via network 111.

Computer 200 generates commands for controlling locking sub-systems (not shown in this Fig.) located on connector-panel systems 104, 106 and 108 in response to processor 202 executing sequences of instructions contained in a computer readable medium, such as main memory 203. A computer-readable medium may include one or more memory devices and/or carrier waves. Such instructions may be read into memory 203 from another computer-readable medium, such as a data storage device 205, or from a separate device via communication interface 208. Execution of the sequences of instructions contained in memory 203 causes processor 202 to perform the process steps described hereinbelow. In alternative embodiments, hard-wired circuitry may be used in place of or in combination with software instructions to implement the computer-controlled connector panel system. Thus, embodiments of the computer-controlled connector panel system or method are not limited to any specific combination of hardware circuitry and software.

The primary difference between usage of a first computer equivalent to computer 200 in remote controller 110 and usage of a second one in local controller 105, 107 or 109 is the size and the content of the databases associated with those computers. Remote controller 110, responsive to user/operator input via input device 206, e.g., a keyboard and mouse on a GUI, can be used to control any or all of the cable-connector-locks (not shown in this Fig.) mounted in any of the connector-panel systems in central office 101, customer facility 102 and hospital-customer 103. Therefore, the database of remote controller 110 is larger than those in each of the computers at locations 101, 102 and 103 because it necessarily includes all relevant data contained in all of the databases associated with all three connector-panel systems at those locations.

Communication interface 208 in a computer 200 located in remote controller 110, through its transceiver (not shown), sends appropriate commands via network 111 to the transceiver (not shown) of another communication interface 208 in another computer 200 located in, e.g., one of local controllers 105, 107 or 109. The receiving controller then routes those commands to its connector-panel system to cause specific locking arms associated with specific connector-receptacles to change state from locked to unlocked, or vice versa. A pre-determined command hierarchy is necessary with the networked arrangement shown in FIG. 1 because of potential conflict which otherwise might occur between conflicting commands concurrently provided by different users located at both the remote controller and at the local controllers. This hierarchy can be established using conventional networking techniques on a per-location basis, thereby avoiding potential command conflicts. For example, with respect to resolving conflicting commands emanating from remote controller 110 and local controller 105, by pre-arrangement, remote controller 110 commands may be given priority over local controller 105, while for conflicting commands emanating from remote controller 110 and local controller 107, by pre-arrangement, local controller 107 commands may be given priority over remote controller 110.

Figure 3:
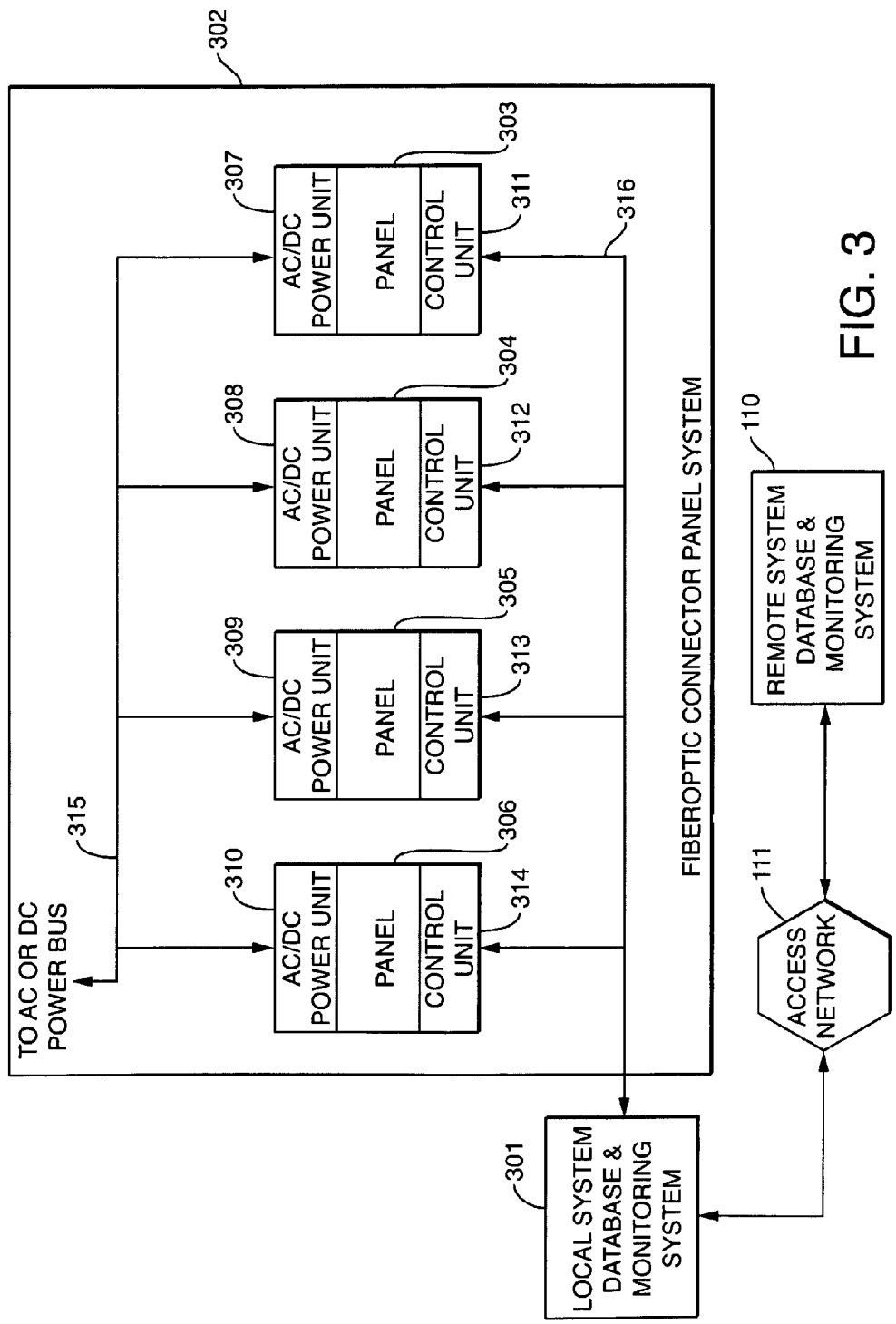
FIG. 3 is an exemplary block diagram of a fiberoptic connector-panel system of the type that is usable in FIG. 1.

FIG. 3 is an exemplary block diagram of a fiber-optic connector-panel system of the type that is usable in FIG. 1. Remote Controller 110 and network 111 in FIG. 3 are identical to their counterparts shown in FIG. 1. Local System Database and Monitoring System 301 (hereinafter "controller 301") is identical to any one of controllers 105, 107 or 109 of FIG. 1. Panel system 302 is equivalent to any one of panel systems 104, 106 or 108 of FIG. 1. In this illustration, panel system 302 includes four separate panels 303, 304, 305 and 306, each with its own AC/DC power unit 307-310, respectively, and lock-control unit 311-314, respectively. More or fewer panels 303-306 can be used per panel system and four are shown only for illustrative purposes. The AC/DC power units are connected to power bus 315 and the lock-control units are connected to controller 301 by a suitable link 316 such as, for example, a USB link.

AC/DC power units 307-310 can be power supplies of standard design, configured for this application. They can convert AC power from power bus 315 to an appropriate level of DC power and/or can reduce the AC voltage from power bus 315 to a suitable AC voltage level, as may be needed, to power solenoids and motors (not shown in this Fig.). The solenoids or motors are associated, one to one, with cable-connector-receptacles (not shown in this Fig.) distributed across panels 303-306. The solenoids or motors are used to move locking arms (not shown in this Fig.), each arm associated with a different receptacle to generate a locked state or an unlocked state for that receptacle whereby a cable-connector (not shown in this Fig.) plugged into that receptacle can be locked in conductive contact or, when unlocked, the connector can be removed. More detail about this operation is presented below.

Control units 311-314 are designed to receive lock/unlock commands over bus 316, which can be a USB bus. The commands originate with a user, typically a company technician tester, located at local controller 301 in a central office of a telecommunications company and/or a user located at remote controller 110 in a remote company office. A command is typically a digital signal in packet format and is addressed to one of the four control units 311-314. Each of control units 311-314 is also designed to convert that command to a higher "lock command" or "unlock command" voltage level to actuate a solenoid or motor. Since that command was addressed to a specific locking-connector-receptacle in a specific panel as explained below, the converted command at the higher voltage level is simply sent to the solenoid or motor at the specific addressed receptacle to achieve the desired result.

Figure 4:
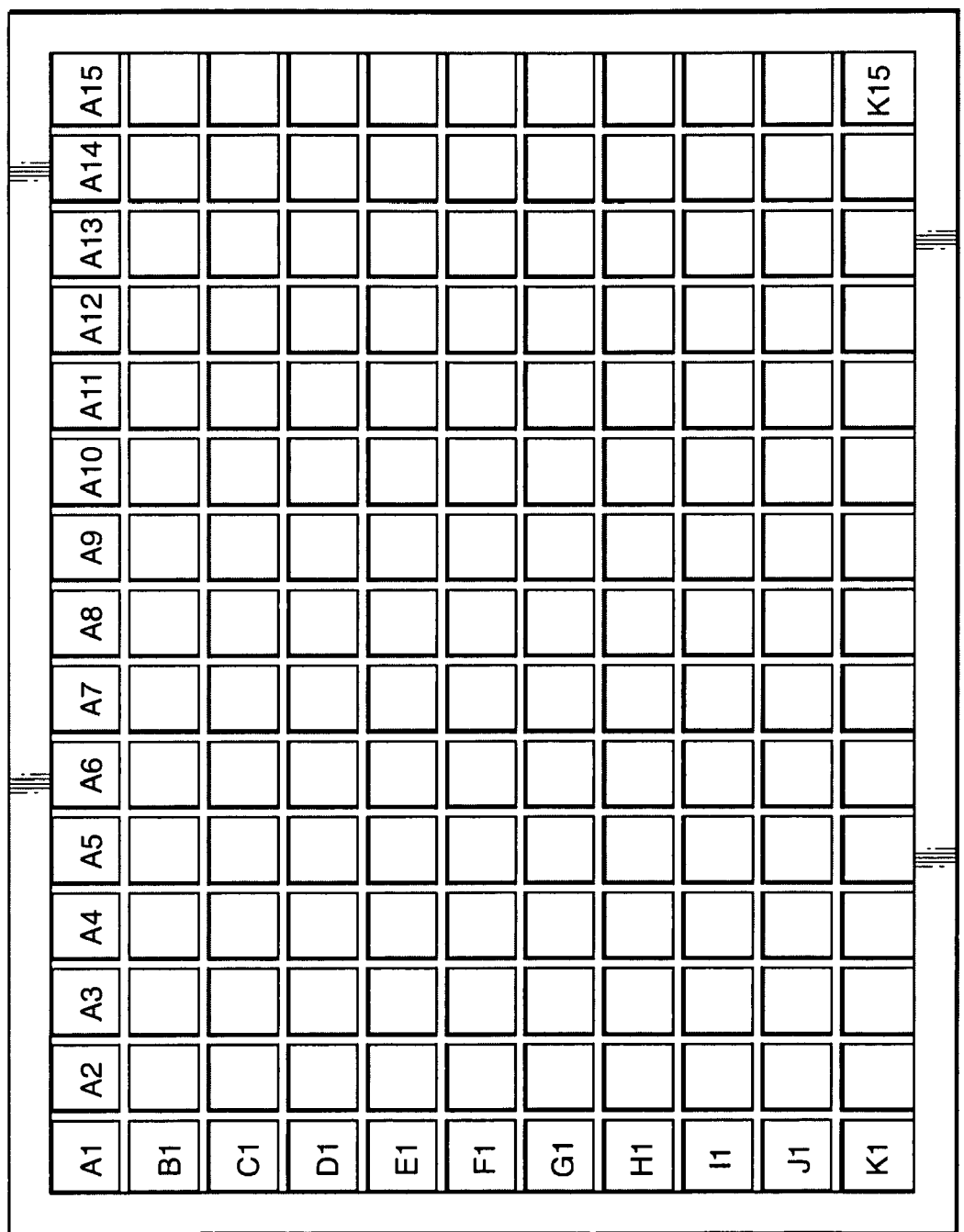
FIG. 4 is a schematic diagram of a fiber-optic connector-panel, depicting an array of connector-receptacle slots having co-ordinates.

FIG. 4 is a schematic diagram of a fiber-optic connector-panel, depicting an array of slots for connector-receptacle locking subsystems, the array having co-ordinates. Although the connector-panel of FIG. 4 is designated "303" for convenience purposes, any of connector-panels 303-306 of FIG. 3 can be represented in this manner. Connector-panel 303 may be a rectangular object having two sides, and a thickness, one side being shown in FIG. 4, and with capability to connect to cables on both sides of the panel. Connector-panel 303 could be two or three feet wide by one or two feet high, or smaller, or larger. Connector-panel 303 could have a thickness from approximately one inch to approximately six inches, more or less. The connector-panel can be made from various strong, insulating materials rated for communications use. Other shapes, sizes and configurations could be used.

Connector-receptacle locking subsystem slots are arrayed across the surface of panel 303 and arranged in horizontal rows and vertical columns. In the example shown, there are fifteen vertical columns designated by the numbers 1-15 and there are eleven horizontal rows designated by the letters A-K. There could be more or fewer columns and rows. In this particular example, that amounts to 165 different connector-receptacles each of which shall be part of its dedicated locking sub-system (not shown in this Fig.). This provides a convenient way of establishing a coordinate system for the array. For example, the connector-receptacle in the lower-right corner of the panel is identified by coordinates "K15" which means the "15$^{th}$" column and the "K$^{th}$" row. Other coordinate systems can be envisioned and used, and this is but one example.

A coordinate system is needed because packet commands arriving from any of the controllers need to be addressed to specific receptacles, and a coordinate system permits the packet commands to address the correct receptacle. The databases in remote controller 110 and, in this instance, local controller 301 would contain these coordinates along with their corresponding connectors' usage and other information, to be discussed below. A packet command that is input by a technician at a particular controller (i.e., by typing into a keyboard at a GUI) is addressed to a specific connector-receptacle located on a specific locking sub-system on a specific panel that is selected because it corresponds to a particular connection which, for reasons relating to testing or other purposes, the technician wishes to make or break. The computer associated with that particular controller accesses its database to obtain the appropriate coordinates for that command.

Figure 5:
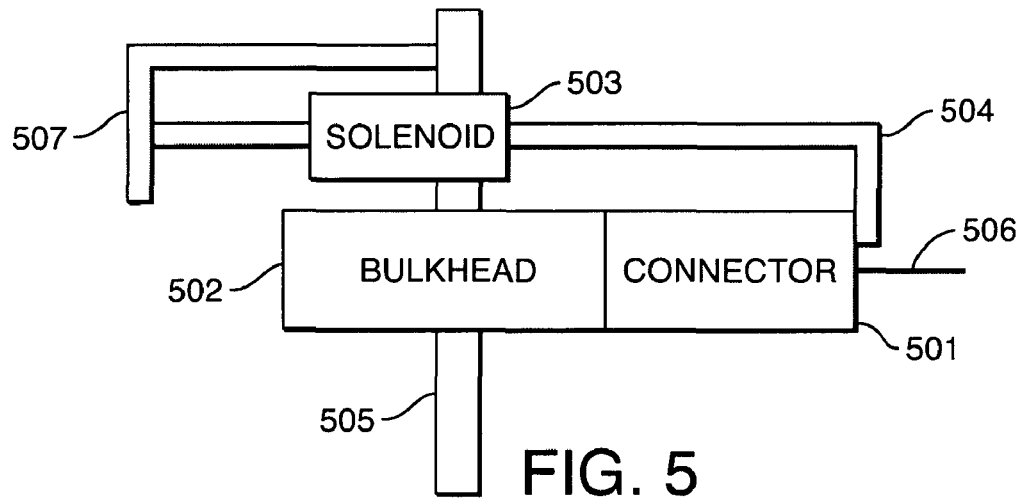
FIG. 5 is an schematic diagram of a locking arm mechanism actuated by a solenoid, the mechanism being useful for inclusion within the computer-controlled connector panel of FIG. 1 or 1A.

FIG. 5 is an exemplary schematic diagram of a connector-receptacle locking subsystem, with attached cable-connector, shown locked by locking arm 504. The subsystem would fit into a single slot of FIG. 4, such as slot K15. The subsystem comprises bulkhead (i.e., connector-receptacle) 502, solenoid 503 with its supporting structure, and locking arm 504. The connector-receptacle 502 and solenoid 503 are physically supported by panel structure 505. Cable-connector 501 is shown connected to connector-receptacle 502 and locked in place. When solenoid 503 is energized, locking arm 504 is axially displaced wherefore it moves to the right in FIG. 5. (In FIG. 4, locking arm 504 would move perpendicular to the plane of the drawing in the direction of the reader.) This axial displacement offers sufficient clearance so that connector 501 may be manually removed by a technician. The connection may be left open, or a different connector 501 may be substituted for the original, or the same connector can be reconnected. There is a backstop with spring sleeve 507 provided so that any recoil motion of the solenoid mechanism is appropriately dissipated when the solenoid is activated. Each of the 165 locations identified by a unique coordinate in FIG. 4 may likewise contain its own connector-receptacle locking sub-system. In this manner, connector 501 cannot be removed with locking arm in its locked position as shown, but can be removed after locking arm 504 is put into an unlocked state.

Figure 6:
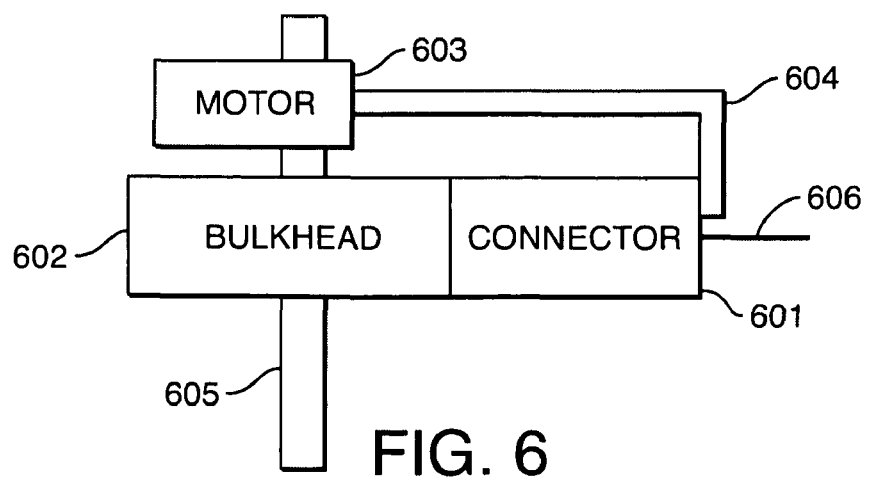
FIG. 6 is an exemplary schematic diagram of a locking arm mechanism actuated by a motor, the mechanism being useful for inclusion within the computer-controlled connector panel of FIG. 1 or 1A.

FIG. 6 depicts an alternative embodiment, using a motor instead of a solenoid. FIG. 6 presents an exemplary schematic diagram of a connector-receptacle locking subsystem, with attached cable-connector, shown locked by locking arm 604. This subsystem would also fit into a single slot (coordinate space) of FIG. 4, such as slot K15. The subsystem comprises bulkhead (i.e., connector-receptacle) 602, motor 603 with its supporting structure, and locking arm 604. The connector-receptacle 602 and motor 603 are physically supported by panel structure 605. Cable-connector 601 is shown connected to connector-receptacle 602 and locked in place. When motor 603 is energized, locking arm 604 is rotationally displaced, thereby offering sufficient clearance for connector 601 to be manually removed. The connection may be left open, or a different connector 601 may be substituted for the original, or the same connector can be reconnected. In this manner, connector 601 cannot be removed with locking arm in its locked position as shown, but can be removed after locking arm 604 is put into a displaced state.

FIG. 7 is an exemplary schematic diagram of a database which may be stored in main memory 203 and/or storage device 205 of computer 200 in FIG. 2. The database depicted in FIG. 7 contains Co-ordinates 701 of all connector-receptacle locking subsystems for which that computer is responsible. For example, if the database under consideration is located in the computer 200 as contained within remote controller 110 as shown in FIG. 1, then all co-ordinate data of all connector-receptacle locking subsystems located in every panel in every panel system in every locale that is being networked with computer 200 shall be maintained in that database. But, if considering, for example, another computer 200 which is associated only with local controller 105 as shown in FIG. 1, then only the coordinates of all connector-receptacle locking subsystems located in every panel of connector-panel system 104 are included in that database.

Figure 4A:
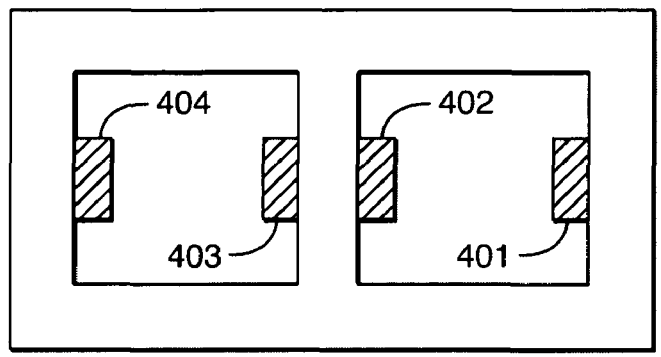
FIG. 4A is an exemplary schematic diagram of connector-receptacle slots of FIG. 4 showing infra-red subsystem.

The database additionally may contain the identity 702 of the connected party. The database additionally may contain the status 703 of each locking arm. The database additionally may provide information 704 regarding presence or absence of a cable-connector in each connector-receptacle. This data can be gathered by using an infra-red transmitter/receiver 401/402 or 403/404 built into the walls of each slot associated with a receptacle subsystem as shown in FIG. 4A, where presence of a connector breaks the infra-red transmission-reception path and absence of the connector allows the transmitter/receiver to communicate.

The database may additionally provide information 705 flagging the criticality of the connection as high, medium, low, not applicable (N/A), etc., where, for example, connection A1 has Hospital XYZ as a connected party for which criticality information 705 is entered in the database as "High." The database additionally may provide information 706 about whether or not a companion cable on the opposite side of panel 303 is connected. The database additionally may provide information 707 about capacity for an alarm (visual on a GUI, or audio over loudspeakers, or both, etc.) which may be activated if connectors are erroneously unplugged. Other data could also be tracked and reported as desired. Or, an alarm can be provided whenever an unlocked state occurs, regardless of plugging/unplugging. In addition, the default state is the locked state. Thus, if power is lost, the locking arms remain locked, and cables remain securely connected, during any power-outage.

With respect to the opposite side of panel 303, it should be understood that there are companion cables (not shown) to which cables on the first side of panel 303, such as cables 506 and 606, as shown in FIGS. 5 and 6, are connected through the panel itself. Signals flow between equipment connected to the ends of these cables, from one piece of equipment connected to the end of a first cable, through the first cable, through the first cable's panel connection to the other cable's panel connection, to the other cable and then via the other cable to the other piece of equipment connected at the end of that other cable. Depending on direction of signal flow, either piece of equipment is signal source equipment or signal destination equipment.

The companion cables may be connected by way of standard connectors which are not lockable as described herein because, typically, that side of the panel is generally left un-touched where mistaken disconnections are minimal. However, a protective shield with a lock and key can be fashioned to encapsulate all companion cables and offer extra security in that manner. Further, the companion cables may be protected by lockable connector-receptacles similar, or identical, to those provided on the first side of the panel, described in detail herein, and akin to a mirror-image to the first side of the panel. In such a case, the panel thickness must be increased accordingly.

It should be understood that every possible connection on either side of the panel need not necessarily be populated, and connections information 706 in the database sheds light on overall usage of the panel. Without a cable connection on the reverse side of the panel corresponding to a particular coordinate, such as C1 in FIG. 4, any connection made from a first piece of equipment via a first cable to the connector-receptacle at coordinate C1 on the front side of the panel shall not offer a communication path to anything more than the panel itself, and not to a second piece of equipment.

Figure 8:
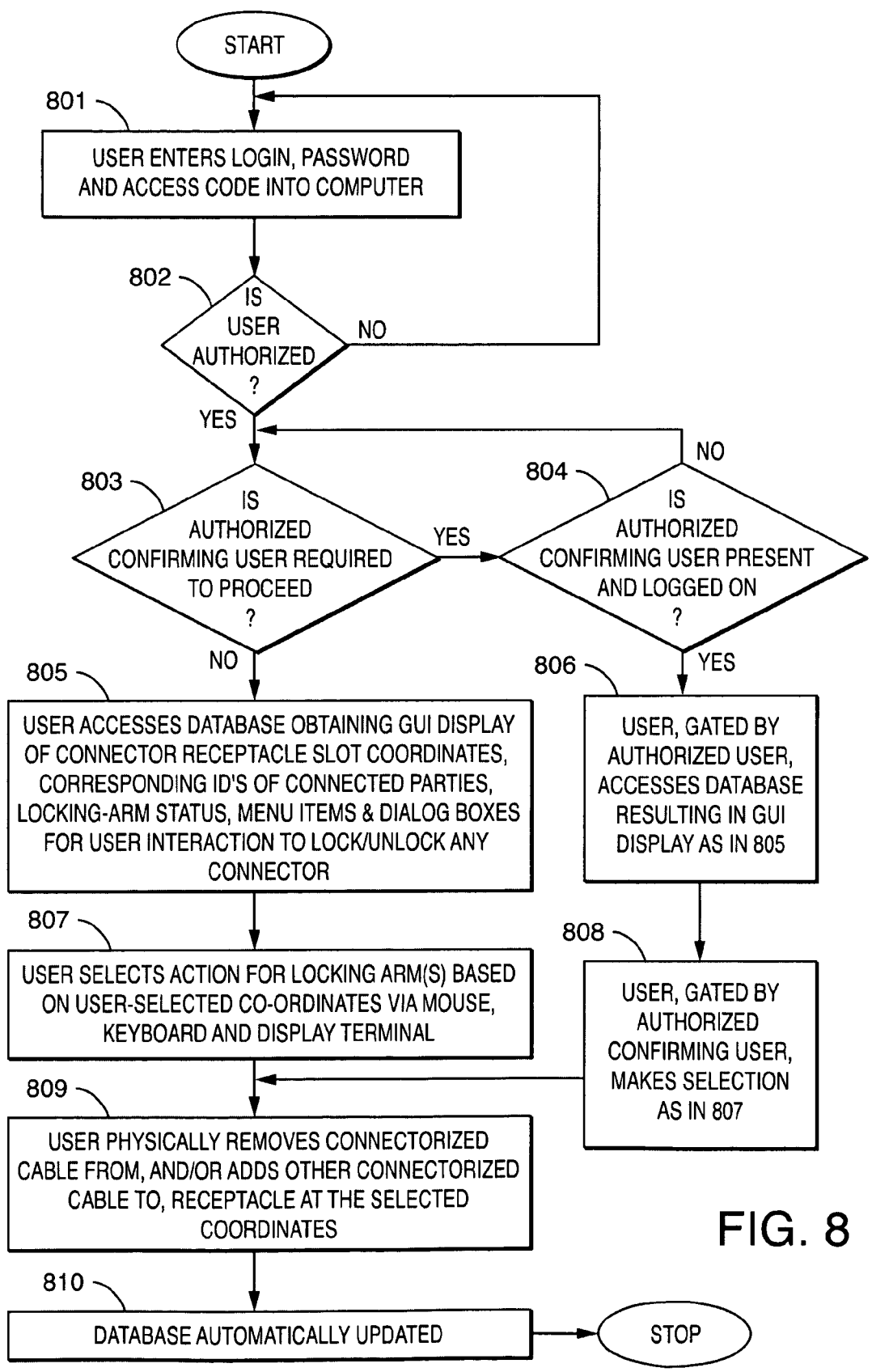
FIG. 8 is a flowchart depicting a methodology, a sequence of events which may be performed by, or with, the computer-controlled connector panel of FIG. 1 or 1A.

FIG. 8 is a flowchart depicting a sequence of events and a methodology which may be performed in, or by, the operation of at least one embodiment of the computer-controlled connector panel. In act 801, the user/technician logs-on to computer 200 by entering his/her access code and password. Typically, only a very few employees of a telecommunications company with a central office in which this connector-panel system resides are allowed to make changes to the panel's connections. In question block 802 the query is made: is the user authorized? If an un-authorized person has intentions to sabotage and create havoc by removing cables, for whatever unacceptable reason, then that person shall be prevented by the present embodiments from proceeding. If "no" the process returns to the beginning and the user reattempts entry, or another user attempts entry. But, if "yes" the user is authorized to make changes to the panel's cabling connections and the process moves to question block 803.

The question in block 803 determines if a second, authorized user is required for confirmation. If user confirmation by another employee is not required, the process moves to action block 805, to be discussed below. On the other hand, if user confirmation is required by another employee, the process moves to question block 804 which determines if the second, authorized user is available, logged-on and ready to participate. If that is not the case, the process returns to the entry to question block 803 where, if the process maintains the requirement of an authorized, confirming user, the process iterates between question blocks 803 and 804 until that condition is satisfied. If that condition is satisfied, the process moves to action block 806, which shall be discussed below.

Returning, first, to action block 805, the user accesses the database, thereby displaying all or part of the data shown in the database of FIG. 7 on the GUI; the data can be displayed over multiple terminal screen presentations by way of scrolling in the usual manner. Along with that data, dialog boxes or menu items are presented on the terminal screen by which the user can make a selection of a particular data entry, and thereby make a selection of a particular cable-connector-receptacle, e.g., the receptacle corresponding to coordinate A1 in FIG. 7. Then, the process moves to action block 807 where the user selects the appropriate action for that connector-receptacle by clicking in the appropriate dialog box or on the appropriate menu item. In this example corresponding to coordinate A1, locking arm status 703 can be changed from "locked" to "unlocked."

The process then moves to action block 809 where the user reaches into the maze of connectors and manually removes the cable-connector from the (only) unlocked connector-receptacle, i.e., that associated with coordinate A1 in this example. A different cable-connector can be substituted, or the same connector can be reconnected, or nothing can be inserted in accordance with user discretion.

The process then moves to action block 810 where the database which is stored in main memory 203 and/or storage device (or backup storage) 205 of computer 200 in FIG. 2 is updated with the latest status of the connector-receptacle at coordinate A1. Moreover, referring to FIG. 1, if the connector-panel system of this example is in a network configuration similar to that shown in FIG. 1, then the two databases that are associated, respectively, one with computer 200 located in a local controller (107-109) and the other with another computer 200 located in remote controller 110, are both updated. Upon completion of database updating, the process ends.

The other path via action blocks 806 and 808 essentially mimics the action taken in the path taken through action blocks 805 and 807. The principal difference between the action taken in the two paths is that the user in blocks 806 and 808 is gated by the other authorized, confirming user for each step taken. Thus, prior to causing any action to occur (e.g., before unlocking a connector) based on the user's interacting with dialog boxes or menu items by manipulation of cursor/mouse, the other authorized, confirming user shall be required to confirm that particular action on a second terminal screen. In other words, the second user shall have to click on the same answer in the same dialog box on a separate terminal screen (and this can be constrained in time to occur within a particular short time period, e.g., within two seconds of the first user's clicking) in order for the locking arm (in this example, associated with coordinate A1) to be changed from a locked to an unlocked state.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. For example, lockable connectors can be provided on one side of the panel, or can be provide on two sides of the panel, as discussed above. Further, the order of steps or acts described herein need not take place exactly as presented or in the exact order presented—e.g., the authorized user in FIG. 8 could be eliminated entirely. Therefore, the specification and drawings are to be regarded in an illustrative rather than restrictive sense.

What is claimed is:

1. A system comprising:
    a connector-panel;
    a first plurality of cable-connector-receptacles formed in said panel as an array, each receptacle having a controllable locking arm;
    a second plurality of cable-connectors, said second plurality being less than, or equal to, in number, said first plurality, each one of said cable-connectors being lockable into a different one of said cable-connector-receptacles by a respective said controllable locking arm;
    a control unit associated with said panel for controlling each said locking arm to be in a locked or unlocked position; and
    a computer system through which a user, gated by an authorized confirming user, can command operation of said control unit to place said each said locking arm in said locked or said unlocked position, said user commanding said operation by interaction with a first GUI display included in said system, said commanding being gated by said authorized confirming user repeating said interaction on a second GUI display included in said system, said gated commanding by said authorized confirming user being required prior to occurrence of any connector action and before said user can command said operation of said control unit to place said each said locking arm in said locked or said unlocked position, wherein said computer system also provides a predetermined time interval measured from said interaction with said first GUI display, and wherein said repeating said interaction on said second GUI display must occur within said predetermined time interval to permit said occurrence of said any connector action and to permit said user to command or control said operation of said each said locking arm into said locked or said unlocked position.

2. The system of claim 1 wherein each one of said receptacles is identified and located by a unique array coordinate.

3. The system of claim 2 wherein said computer system includes:
a database containing said array coordinate information for said each one of said receptacles and at least status information on said each said locking arm associated, respectively, with said each one of said receptacles.

4. The system of claim 3 wherein said computer system further includes:
an input/output subsystem by which a user can observe said status information for said each said locking arm and direct a command to a particular locking arm located at a particular said array coordinate to place said particular locking arm in said locked or said unlocked position.

5. The system of claim 4 wherein said input/output system comprises a keyboard operating with a graphical user interface (GUI) terminal screen and a mouse.

6. The system of claim 5 wherein said GUI displays an equivalent of said unique array coordinate for all or a portion of said each one of said receptacles along with said status information corresponding to said coordinate and an icon or dialog box corresponding to said status information, thereby enabling a user of said GUI to enter said command by appropriate clicking of said mouse on said icon or in said dialog box.

7. The system of claim 4 wherein said user directs commands to said particular locking arm via a network.

8. The system of claim 7 wherein said network is a local area network (LAN), wide area network (WAN) and/or Internet.

9. The system of claim 3 wherein said status information further comprises:
connector position information about whether or not a cable-connector is positioned in said each one of said receptacles.

10. The system of claim 9 wherein, for certain of said receptacles each having a different one of said cable-connectors positioned therein, said status information further comprises:
locking information about whether or not said each different cable-connector is locked in position.

11. The system of claim 9 wherein said connector position information is provided by operation of an infra-red detection system installed in said each one of said receptacles.

12. The system of claim 1 wherein:
each of said first plurality of cable-connector-receptacles is located on a first side of a two-sided panel of said panel system and conductively connected through said panel to a second side of said panel;
each of a first plurality of cables, on said second side of said two-sided panel, is conductively connected at one end thereof to a different one of said first plurality of cable-connector-receptacles on the second side of said two-side panel; and
each of said second plurality of cable-connectors is permanently attached to one end of a different one of a second plurality of cables on said first side of said panel, said second plurality of cable-connectors being equal in number to said second plurality of cables.

13. The system of claim 12 wherein said second plurality of cables on the first side of said panel is selected from the group of cables consisting of fiber optic cables, coaxial cables and Cat 5 cables.

14. The system of claim 13 wherein said first plurality of cables on the second side of said panel is selected from the group of cables consisting of fiber optic cables, coaxial cables and Cat 5 cables to match the selected group of second plurality of cables.

15. The system of claim 12 wherein said each of said first plurality of cables is connected at the other end thereof to a source and/or destination for signals conducted through a respective one of said second plurality of cables.

16. The system of claim 1 wherein said locking arm has a default position and said default position is said locked position.

17. The system of claim 1 wherein said each one of said cable-connectors is locked into its respective receptacle and said each controllable locking arm further comprises:
a solenoid or a motor for moving a mechanical constraint bar in a manner to allow withdrawal of any one or more of said each one of said cable-connectors.

18. The system of claim 17 wherein a different cable-connector can be manually inserted into a receptacle from which said any one cable-connector was withdrawn.

19. The system of claim 1 wherein said interaction is clicking on an answer in a dialog box on a terminal screen on said first GUI display and said repeating is clicking, on the same said answer in a substantially identical dialog box on a different terminal screen on said second GUI display.

20. A system comprising:
a connector-panel;
a plurality of cable-connector-receptacles formed in said panel, each receptacle having a controllable locking arm;
a plurality of cable-connectors, each one of said cable-connectors being locked into a different one of said cable-connector-receptacles by a respective said controllable locking arm; and
a computerized sub-system through which a user, gated by an authorized confirming user, controls operation of each said controllable locking arm, said user controlling said operation by interaction with a first GUI display included in said sub-system, said controlling being gated by said authorized confirming user repeating said interaction on a second GUI display included in said sub-system, said gated controlling by said authorized confirming user being required prior to occurrence of any connector action and before said user controls said operation of said each said controllable locking arm into a locked or an unlocked position,
wherein said computerized sub-system also provides a predetermined time interval measured from said interaction with said first GUI display, and wherein said repeating said interaction on said second GUI display must occur within said predetermined time interval to permit said occurrence of said any connector action and to permit said user to command or control said operation of said each said locking arm into said locked or said unlocked position.

21. The system of claim 20 wherein said cable-connectors are fiber-optic cable connectors, said system further comprising:
  a plurality of fiber optic cables conductively connected, respectively, to said each one of said fiber-optic cable-connectors;
  whereby any one or all of said fiber-optic cables can only be removed and re-connected, or can only be removed and replaced with a different fiber-optic cable, under control of said computerized subsystem.

22. The system of claim 20 wherein said interaction is clicking on an answer in a dialog box on a terminal screen on said first GUI display and said repeating is clicking on the same said answer in a substantially identical dialog box on a different terminal screen on said second GUI display.

23. A method, comprising:
  providing a plurality of cable-connectors locked in their respective connector-receptacles distributed over a connector-panel; and
  unlocking, only by operation of a computer, one or more of said plurality of cable-connectors, said computer receiving a command to initiate said unlocking from a user gated by an authorized confirming user, said user issuing said command by interaction with a first GUI display, said authorized confirming user duplicating said interaction on a second GUI display, said user command to initiate said unlocking not causing any connector action to occur prior to occurrence of said authorized confirming user gated command, said authorized confirming user gated command required for said unlocking to occur,
  wherein said operation of said computer also provides a predetermined time interval measured from said interaction with said first GUI display, and wherein said authorized confirming user must duplicate said interaction on said second GUI display within said predetermined time interval to provide said authorized confirming user gated command required for said unlocking to occur.

24. The method of claim 23 further comprising:
  cables connected to said cable-connectors.

25. The method of claim 24 wherein said cables are fiber-optic cables.

26. The method of claim 23 wherein said one or more cable-connectors are available to be manually unplugged from their connector-receptacles.

27. The method of claim 23 wherein said connector-panel has two sides separated by a panel-thickness and said lockable connector-receptacles are distributed either over one of said two sides only or are distributed over said two sides.

28. The method of claim 23 wherein said unlocking further comprises:
  said user obtaining information from a database via said computer on said connector-receptacles;
  said user selecting one of said connector-receptacles from said information;
  said user entering said command into said computer to change locking state of said one of said connector-receptacles;
  said computer transmitting said command to a controller associated with said panel; and
  said controller controlling said locking state of said one of said connector-receptacles to conform to said command.

29. The method of claim 23 wherein said interaction is clicking on a particular answer in a dialog box on a terminal screen on said first GUI display and said duplicating is clicking on said particular answer in a substantially identical dialog box on a different terminal screen on said second GUI display.

30. A system comprising:
  a connector-panel;
  a plurality of cable-connector-receptacles formed in said panel, each receptacle having a controllable locking arm;
  a plurality of cable-connectors, each one of said cable-connectors being locked into a different one of said cable-connector-receptacles by a respective said controllable locking arm; and
  a computerized sub-system through which a user, gated by an authorized confirming user, controls operation of each said controllable locking arm, said user controlling said operation by interaction with a first GUI display included in said sub-system, said controlling being gated by said authorized confirming user repeating said interaction on a second GUI display included in said sub-system,
  wherein said computerized sub-system also provides a predetermined time interval measured from said interaction with said first GUI, and wherein said repeating said interaction on said second GUI display must occur within said predetermined time interval to permit occurrence of any connector action and to permit said user to command or control said operation of said each said locking arm into a locked or unlocked position.

31. A method, comprising:
  providing a plurality of cable-connectors locked in their respective connector-receptacles distributed over a connector-panel; and
  unlocking, only by operation of a computer, one or more of said plurality of cable-connectors, said computer receiving a command to initiate said unlocking from a user gated by an authorized confirming user, said user issuing said command by interaction with a first GUI display, said authorized confirming user duplicating said interaction on a second GUI display,
  wherein said operation of said computer also provides a predetermined time interval measured from said interaction, with said first GUI display, and wherein said authorized confirming user must duplicate said interaction on said second GUI display within said predetermined time interval to provide said authorized confirming user gated command required for said unlocking to occur.

* * * * *